United States Patent [19]

Ballard

[11] 4,328,877
[45] May 11, 1982

[54] AUTOMATIC TWO-SPEED DRIVE SYSTEM

[76] Inventor: Billie E. Ballard, Box 117, Rte. 2, Sapulpa, Okla. 74066

[21] Appl. No.: 141,413

[22] Filed: Apr. 18, 1980

[51] Int. Cl.³ ............................................. B60K 17/02
[52] U.S. Cl. ............................... 180/70 R; 74/336 B; 192/49; 192/103 A; 192/104 R; 192/105 CE; 474/70
[58] Field of Search ................... 180/70 R, 71, 72, 75, 180/76, 70 MS, 245, 205, 206, 207; 74/336 B, 665 GE; 192/49, 103 A, 104 R, 103 B, 105 CE; 474/70, 74

[56] References Cited

U.S. PATENT DOCUMENTS

| | | | |
|---|---|---|---|
| 2,230,293 | 2/1941 | Harris | 74/336 B X |
| 2,493,744 | 1/1950 | Berger | 192/105 CE X |
| 2,555,929 | 6/1951 | Jensen et al. | 192/104 R |
| 2,886,977 | 5/1959 | Ausdall | 74/336 B X |
| 3,424,261 | 1/1969 | Sheldon | 180/70 R |
| 3,845,666 | 11/1974 | Auramidis | 192/104 R X |

Primary Examiner—David M. Mitchell
Assistant Examiner—Randall A. Schrecengost
Attorney, Agent, or Firm—James H. Chafin

[57] ABSTRACT

An automatic two-speed drive system for a vehicle having two drive wheels. A first drive wheel is connected to the drive source through a low-speed hub which is disengaged when the wheel reaches a pre-determined rotational speed. The second drive wheel is connectable to the drive source through a high-speed hub which becomes engaged when the drive source reaches a pre-determined rotational speed.

9 Claims, 10 Drawing Figures

AUTOMATIC TWO-SPEED DRIVE SYSTEM

BACKGROUND OF THE INVENTION

1. Field of the Invention

The present invention relates to a two-speed drive system for vehicles and more particularly, but not by way of limitation, to a pair of hubs operably connected by individual drive wheels, the first hub operating at low vehicles speeds and the second hub operating at high engine speeds.

2. History of the Prior Art

With the onset of the energy crises, individuals and manufacturers are turning to smaller vehicles for economical transportation. It has further been found that better gasoline mileage can be achieved by utilizing what amounts to an undersized engine for a particular vehicle. However, the use of undersized engines requires a wider variety of gear ratios in order to operate the vehicle in ordinary traffic conditions. For example, motorcycle parts, including the engine, could be used to operate light vehicles so long at the proper gearing is provided for that vehicle.

A major problem in the manufacturing of a vehicle which may be used in traffic or a special purpose vehicle is that of providing a differential gear box for the drive wheels. The differential is required so that in turning a corner, the drive wheels may be turned at different speeds to prevent excessive tire wear. However, if one of the tires encounters mud or a slick surface, only that one tire will turn and the vehicle may become stuck even though the other tire may be on sound footing. Therefore, in manufacturing a small vehicle, providing a differential gear box can be one of the major design problems.

SUMMARY OF THE INVENTION

The present invention provides a two-speed drive system to operate two drive wheels of a vehicle through two separate gear ratios without the use of a differential gear box.

The system is designed for use with a light vehicle which is driven with a motorcycle engine using a chain drive. However, the invention is readily adaptable for use with substantially any motor driven vehicle. The system comprises two separate vehicle drive wheels. The first drive wheel is mounted for rotation on a fixed axle and is provided with a low-speed drive hub. The hub is attached for rotation with the drive wheel and is provided with a sprocket wheel for connection to the drive source by a suitable endless belt or chain.

A plurality of centrifugal weights are carried by the hub member, the weights being operably connected to a sprocket attachment hub. When the wheel and associated hub reach sufficient rotational speed, the weights are forced outwardly by centrifugal force and in turn disengage the drive sprocket from the hub so that the sprocket is free-wheeling on the hub. Hence, the low-speed hub is engaged for driving the vehicle in the low speed ranges.

The second drive wheel is carried by an individual axle stub. A high-speed is journalled on this axle and is provided with a drive sprocket wheel which is connected by a suitable chain to the drive source. This sprocket wheel is of a smaller diameter than the low-speed sprocket wheel to provide a higher gear ratio.

A second set of centrifugal weights are carried by the high-speed hub and are operably connected to a pair of friction bands such as brake shoes. The second drive wheel is provided with a hub or drum member for interacting with the brake shoes to effectively connect the drive wheel with the high-speed hub.

Hence, when the speed of the high-speed hub reaches a pre-determined level, the weights move outwardly thereby expanding the brake shoes into contact with the drum, hence imparting drive power to the second drive wheel.

Therefore, the high-speed hub is engaged for operating the vehicle in the high speed ranges.

The high-speed hub is also provided with a disk having a plurality of ratchet pawls around the outer periphery thereof. The drum, in turn, is provided with a ring having inwardly extending ratchet teeth for interacting with the ratchet pawls.

The ratchet pawls are biased so that the high-speed hub may rotate forwardly at a faster speed than the drive wheel but may not rotate slower than the drive wheel. This not only provides a reverse drive capability for the vehicle, but provides for positive engine braking on hills and during deceleration.

Therefore, the present invention provides an extra gear in addition to that provided by the transmission and eliminates the need for a differential gear box. Further, if the wheel associated with the low-speed hub becomes stuck, by racing the engine, the high-speed hub will engage thereby transferring drive to the other drive wheel which may be on solid footing.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENTS

Figure 1:
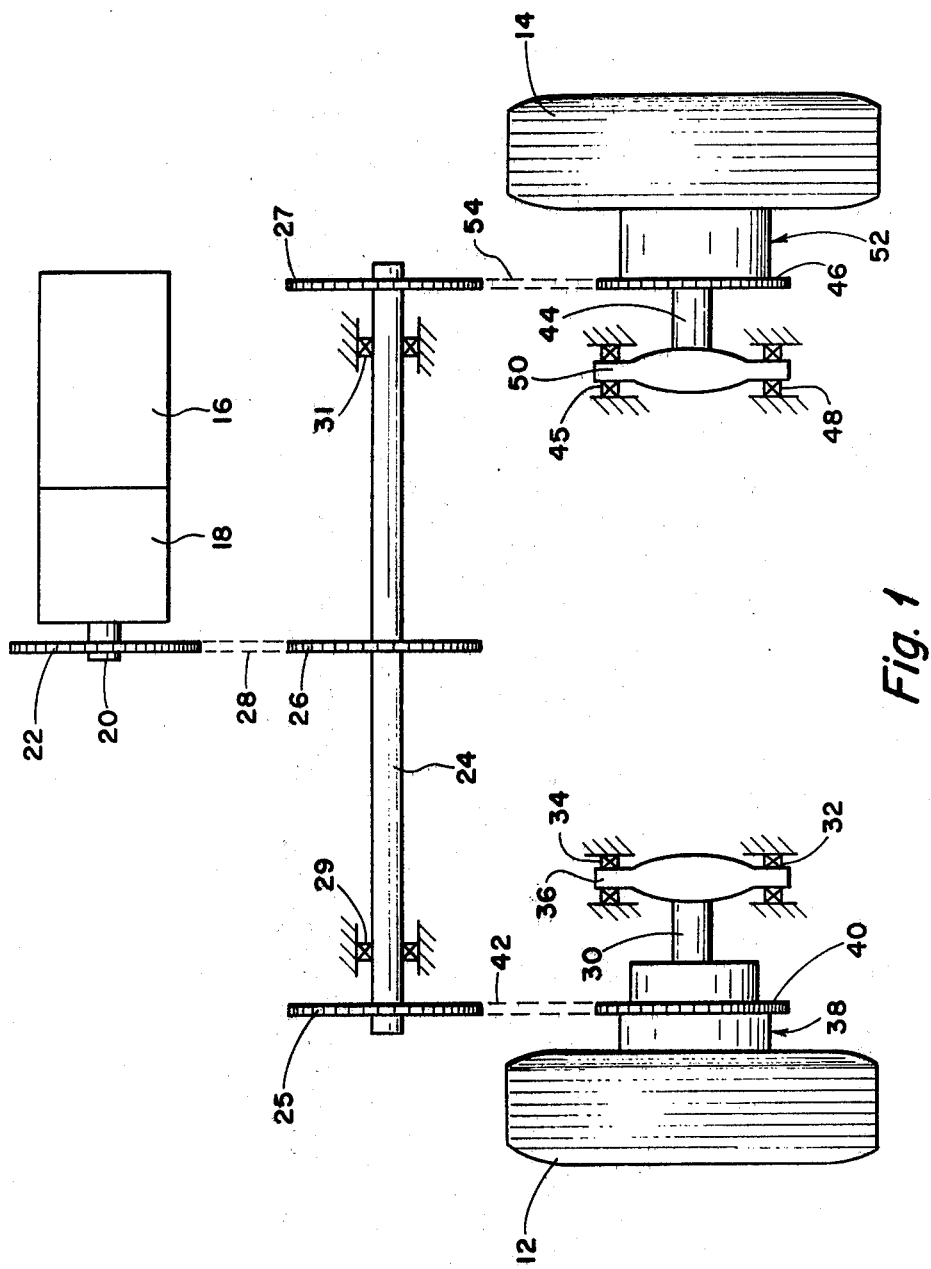
FIG. 1 is a plan view of a pair of vehicle drive wheels and engine embodying the present invention.

Referring to the drawings in detail, reference character 10 generally indicates an automatic two-speed drive system for a vehicle which employs a pair of spaced drive wheels 12 and 14. The vehicle is provided with a drive motor 16 which may be substantially any type of motor but in this case, represents a motorcycle type engine, the output of which is connected to a suitable transmission 18 which in turn is provided with a drive shaft 20 and associated sprocket wheel 22.

The vehicle is also provided with a common drive shaft 24 which is secured to the frame by bearings provided with a suitable sprocket 26 which is in turn connected for rotation with the drive sprocket 22 by means of a suitable endless belt or chain 28. The common drive shaft 24 is provided with a pair of spaced sprocket wheels 25 and 27.

The drive wheel 12 is rotatably carried by a first axle member 30. The axle 30 is an axle stub which is pivotally carried by the frame member (not shown) by suitable bearings 32 and 34 so that the axle stub 30 may pivot about a longitudinal member 36.

A low-speed hub member generally indicated by reference character 38 is attached to the wheel 12 and is provided with a movable sprocket member 40.

The sprocket wheel 40 is operably connected to the drive sprocket wheel 25 by means of a suitable endless belt or chain 42.

The second drive wheel 14 is rotatably carried by a similar axle stub 44 which again is pivotally mounted to the frame by suitable bearings 45 and 48 for rotation about a longitudinal attachment member 50. A high-speed hub member generally indicated by reference character 52 is rotatably carried by the axle stub 44 and is provided with a sprocket wheel 46. The sprocket wheel 46 is of a smaller diameter than the sprocket wheel 40 to provide a higher gear ratio to the high-speed hub 52. The sprocket wheel 46 is connected to the drive sprocket 27 by means of a suitable endless belt or chain 54.

Referring now to FIGS. 2 through 5, the axle stub 30 comprises a plurality of reduction surfaces 56, 58 and 60. The wheel 12 is journalled on the outer axle end 60 by a plurality of wheel bearings 62 and 64 for rotation with respect to the axle 30. The low-speed hub 38 is hence secured to the wheel 12 by bolts 64.

The hub member 38 comprises a first section 66 which is rigidly attached to the wheel 12 and a second section 68 which is longitudinally movable with respect to the axle 30 by a plurality of pin members 70.

A helical compression spring 72 is provided on the axle surface 56 and serves to urge the hub member 68 toward the hub member 66 for a purpose that will be hereinafter set forth.

The hub member 66 comprises a metal plate member 74 one side of which is secured to the wheel 12 by the bolts 64. The plate member 74 is provided with four radially spaced grooves 76. A pair of bracket members 78 are secured on each side of each groove 76 by bolts 80. A substantially L-shaped lever arm 82 is pivotally attached to each set of brackets 78 by means of pivot pins 84. Each lever arm 82 extends partially back into the recesses 76. The outer end of each lever arm 82 is provided with a centrifugal weight member 86, the weight member 86 being pivotally attached to said outer end of the lever arm 82 by means of a bracket 88 and associated pivot pin 90.

Figure 2:
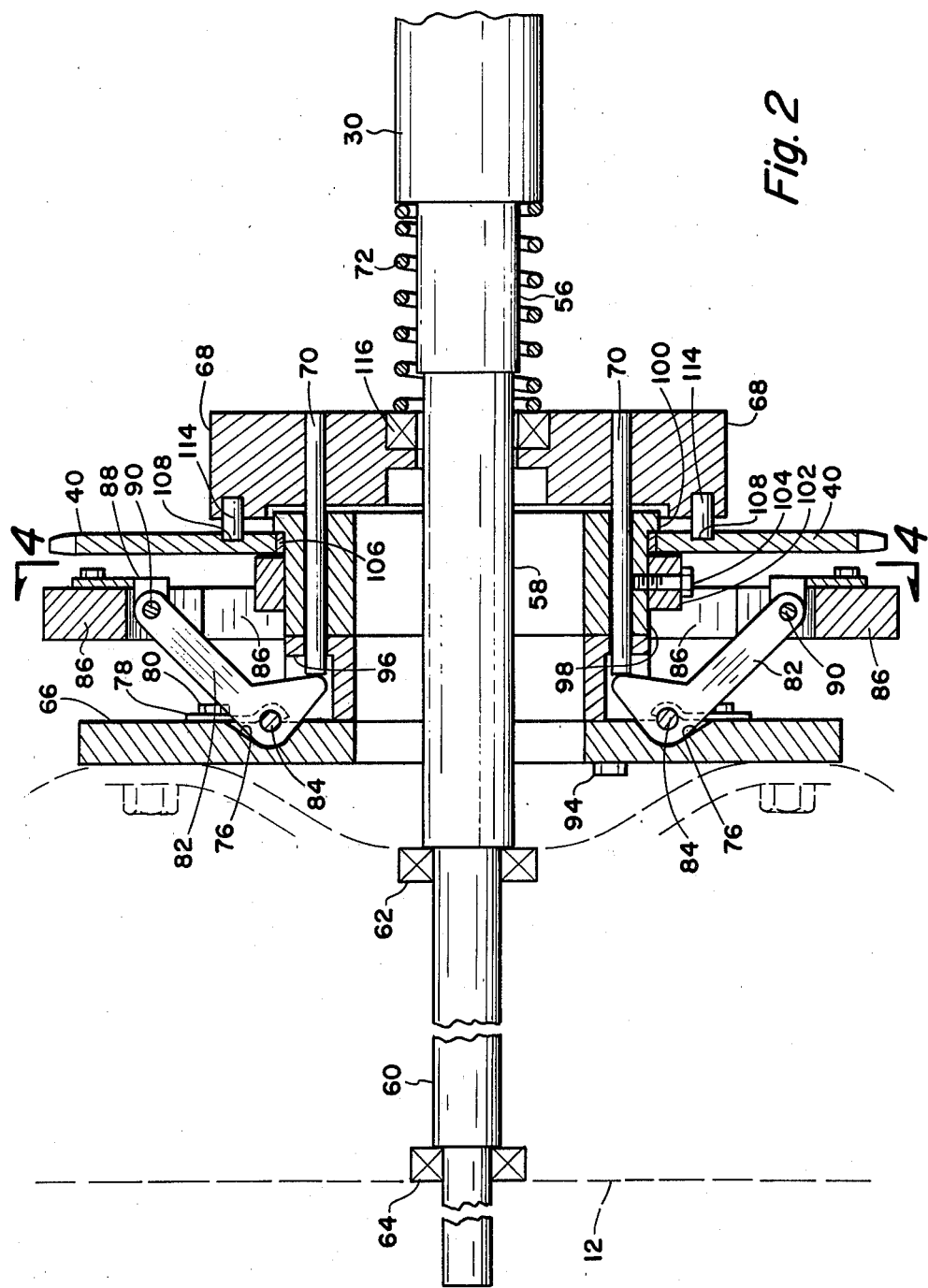
FIG. 2 is a sectional view of the low-speed hub assembly in an engaged position.

The hub member 66 further comprises an annular member 92 which is secured to the plate member 78 by screws 94. The annular member 92 is provided with four spaced grooves 94 which are in alignment with the grooves 76 of the plate member 74. The grooves 94 receive the opposite end of the lever arm 82 as shown in FIG. 2.

A second annular member 98 is secured to the annular member 92 by means of the screws 94. The annular member 98 is provided with a flange 100 for receiving the sprocket member 40 thereagainst. The sprocket member 40 is held in place on the cylindrical member 98 by means of an annular retaining ring 102 and bolts 104. An annular sleeve member 106 is interposed between the sprocket member 40 and annular member 98 and serves as a bushing to allow the sprocket member 40 to rotate about the annular member 98.

The inner face of the sprocket wheel 40 is provided with four arcuate recesses 108, each recess being deep at one end to form a straight-walled groove at 110 and being uniformly tapered to the surface of the sprocket wheel at the opposite end 112. These tapered grooves 108 extend substantially around the inner surface of the sprocket wheel, each groove being made more shallow in a clockwise direction as viewed in FIG. 5.

The outer surface of the plate member 68 is provided with four outwardly extending pin members 114 which are spaced from the center of the plate 68 by a distance so that they lie in alignment with the tapered grooves 108 of the sprocket wheel 40. When the plate member 68 is positioned on the axle 30 such that it is adjacent the annular member 98, the pin members 114 extend into the grooves 108.

The plate member 68 is also provided with four elongated outwardly extending pins 70 which extend through aligned bores in the annular members 98 and 92 such that the outer end of each pin 70 is in continuous contact with one end of the lever arm 82. These pin members 70 serve to support the plate member 68 with respect to the hub portion 66.

As hereinbefore stated, the plate member 68 is urged toward the hub member 66 by means of the helical compression spring 72. In order to reduce friction between the outer end of the compression spring 72 and the plate member 68, the plate member 68 is provided with a split bearing 116.

In operation, when the wheel 12 is not turning or is turning slowly, the spring member 72 urges the plate member 68 outwardly so that the pins 114 contact the grooves 108 of the sprocket wheel 40. This connects power to the low-speed hub via the sprocket member 40 since the sprocket member 40 is turning with the hub 66 and the plate member 68.

Figure 3:
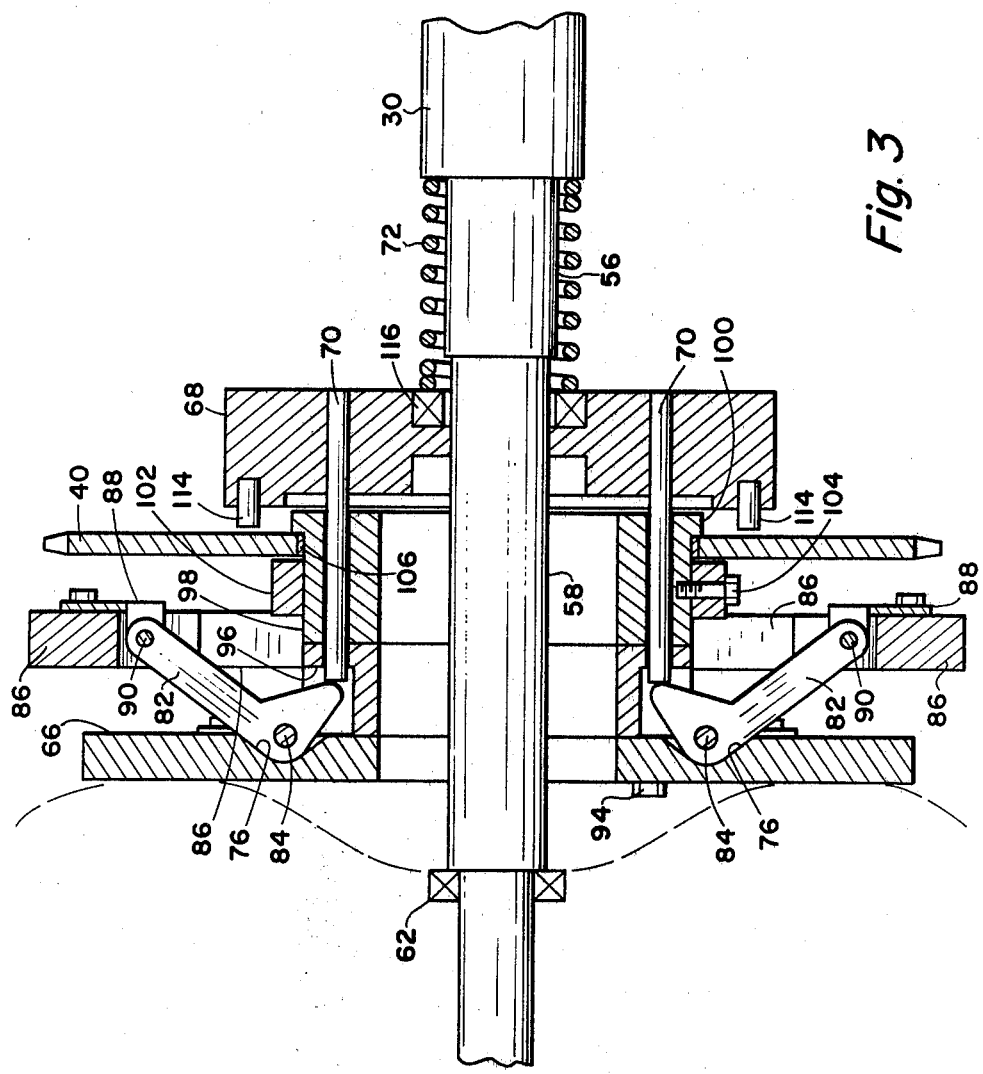
FIG. 3 is a sectional view of the hub assembly of FIG. 2 in a disengaged position.
Figure 4:
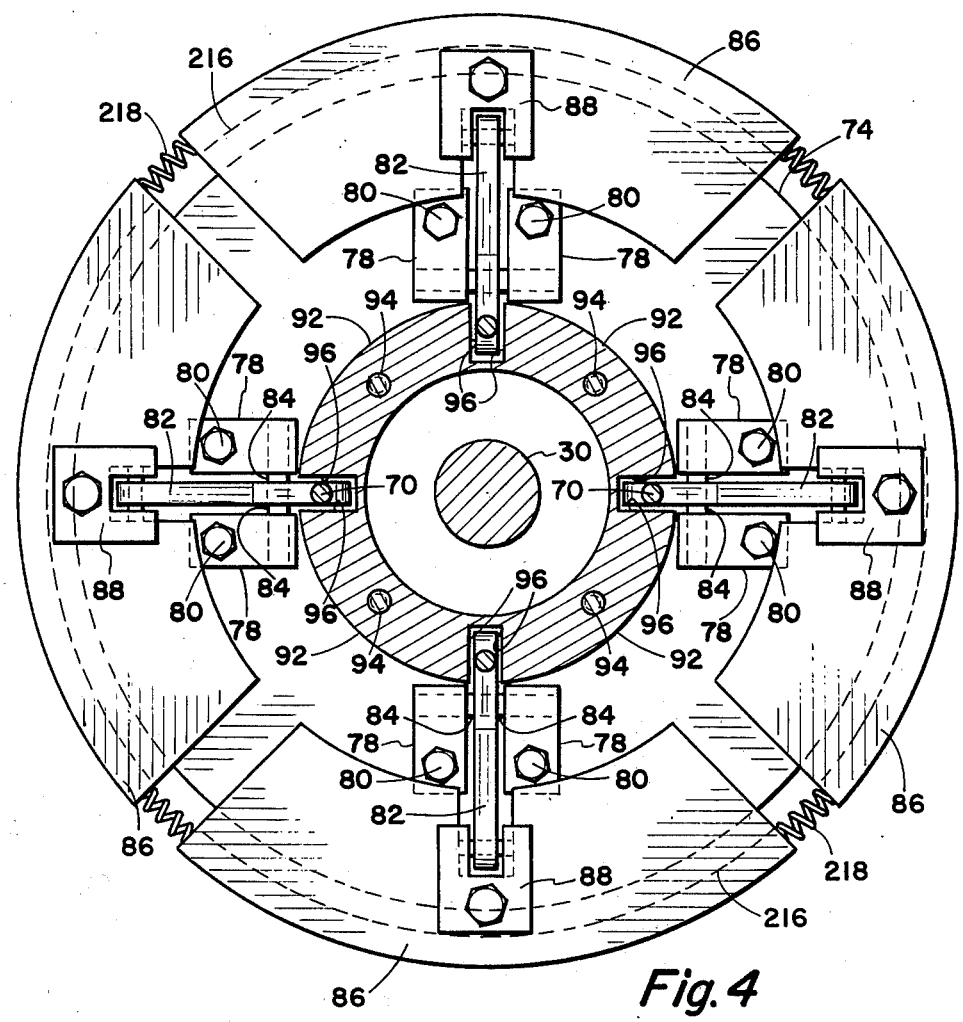
FIG. 4 is an end elevational sectional view of the low-speed hub taken along the broken lines 4—4 of FIG. 2.
Figure 5:
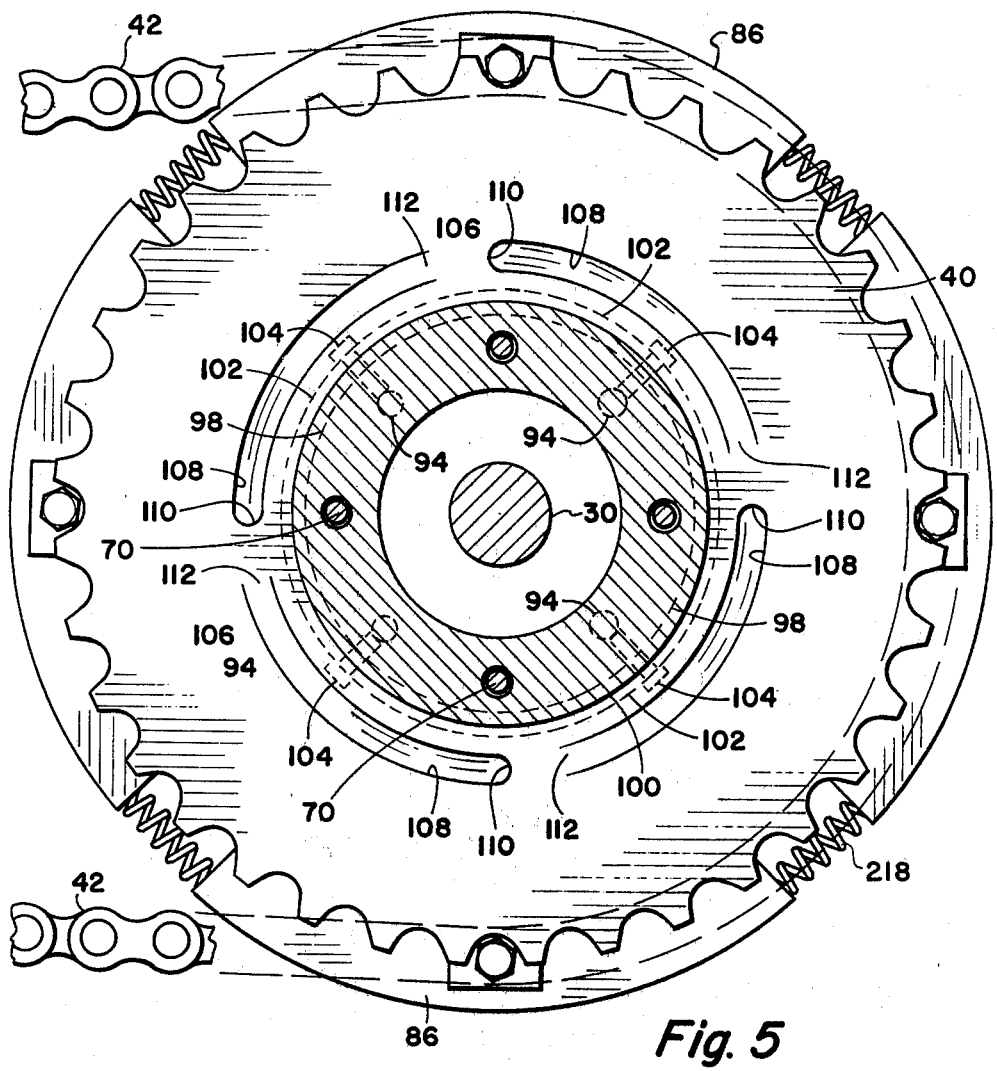
FIG. 5 is a sectional view of the low-speed hub taken along the broken lines 5—5 of FIG. 3.

As the wheel member 12 gains speed, centrifugal force will start acting on the weights 86 causing them to move outwardly. As the weights move outwardly, the lever arms 82 pivot about pins 84, the inner ends of said lever arms forcing the pins 70 inwardly which in turn forces the plate member 68 inwardly against the force of the compression spring 72. When the plate member 68 has been pushed inwardly far enough, as shown in FIG. 3, the pin members 114 disengage from the grooves 108 of the sprocket wheel 40 thereby causing the sprocket wheel 40 to free-wheel on the annular member 98 thereby removing drive from the low-speed hub.

Referring to FIGS. 6 through 10 of the drawings, the hub member 52 comprises a cylindrical member 120 having an annular groove 122 at the inner end thereof for receiving the sprocket wheel 46 thereon. The sprocket wheel 46 is attached to the cylindrical member 120 by bolts 124. The inner end of the cylindrical member 120 is supported on the axle 44 by bearings 126. A circular plate member 128 is secured to the outer end of the cylindrical member 120 by bolts 130, the plate member 128 being provided with an outwardly extending sleeve member portion 132.

The sleeve member 132 is mounted on the axle 44 by suitable bearings 134.

The wheel 14 is secured to the outer end of the axle 44 by means of bearings 136 and 138. A circular plate member 140 is secured to the inner surface of the wheel 14 by bolts 142. The outer periphery of the plate member 140 is provided with an inwardly extending cylindrical portion 144, the plate member 140 and the associated cylindrical portion 144 will be hereinafter referred to as the drum.

Figure 6:
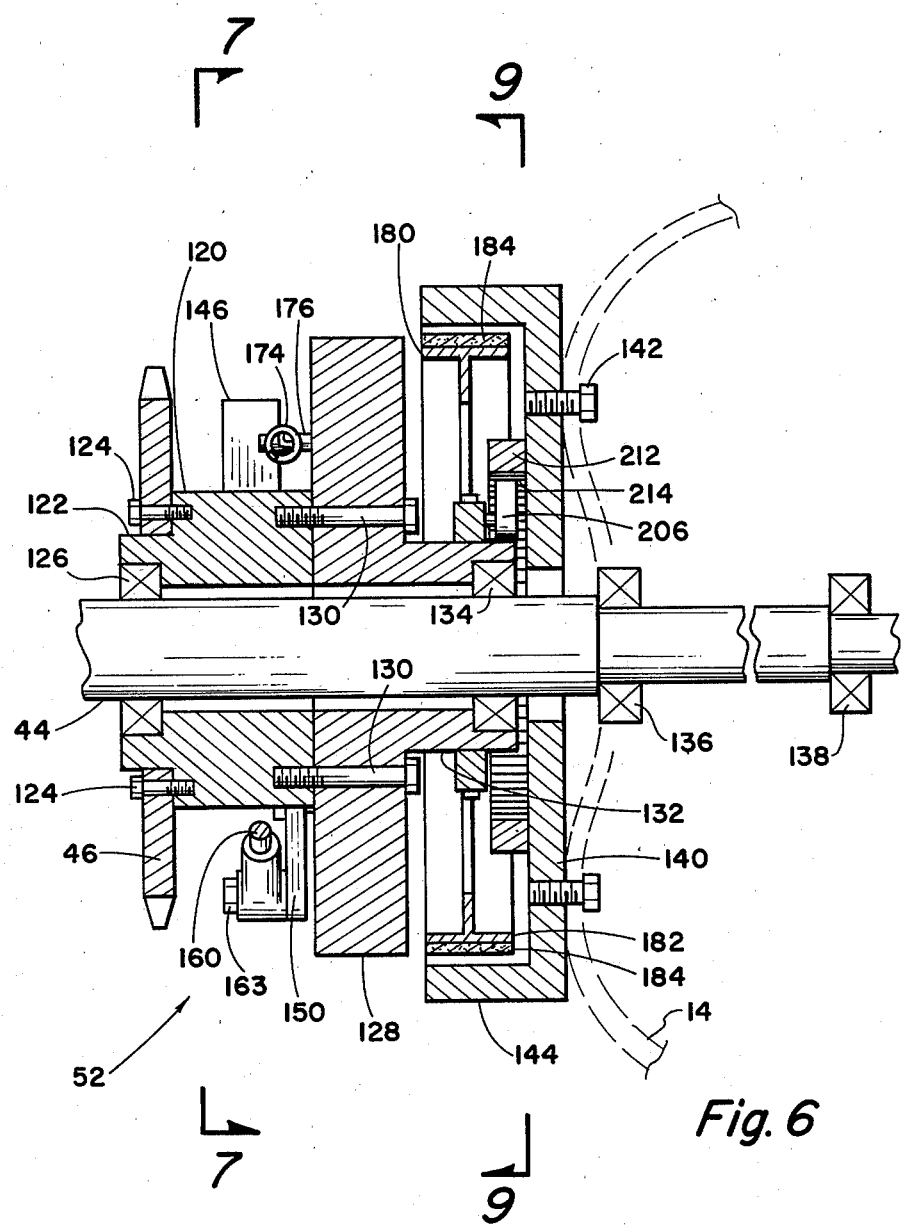
FIG. 6 is a sectional view of the high-speed hub assembly.
Figure 7:
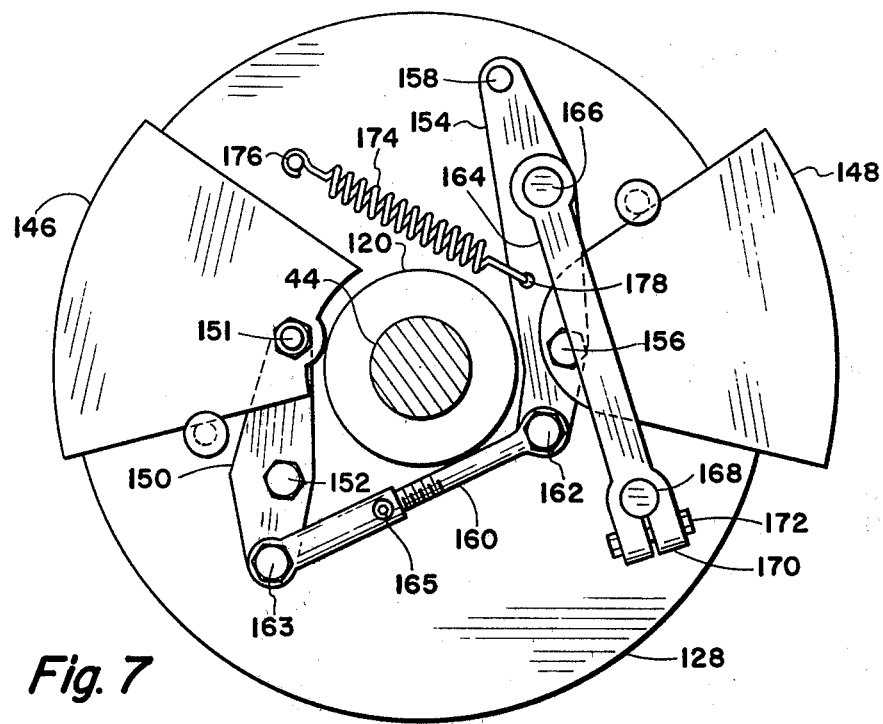
FIG. 7 is a sectional view of the high-speed hub assembly taken along the broken lines 7—7 of FIG. 6.
Figure 8:
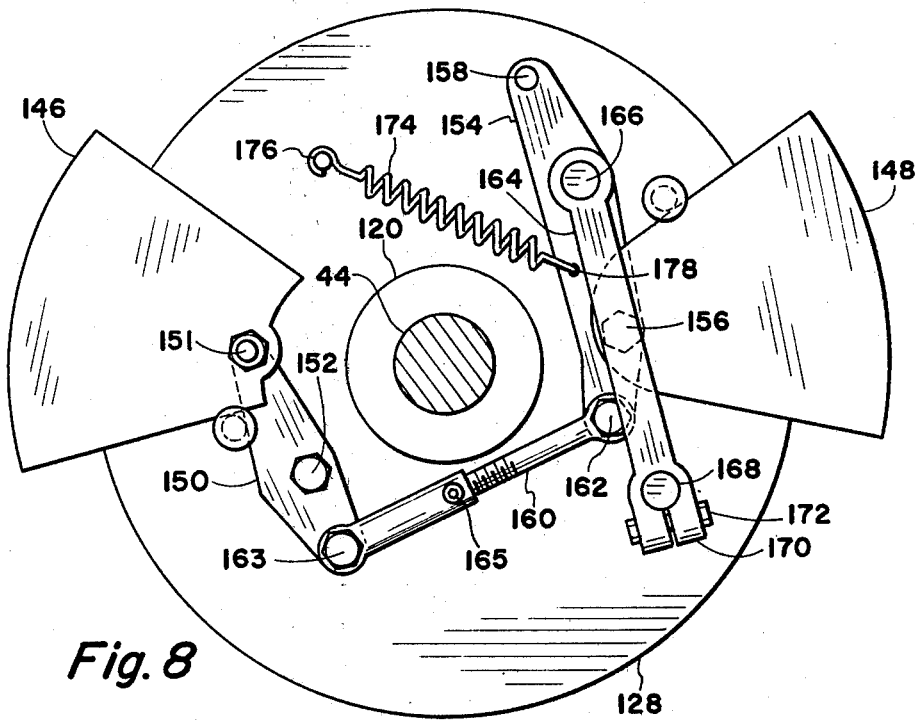
FIG. 8 is a sectional view of the apparatus of FIG. 7 shown in a second position.

Referring to FIGS. 6, 7 and 8, the inner surface of the plate member 128 is provided with a pair of oppositely disposed centrifugal weight members 146 and 148. The weight member 146 is pivotally secured to one end of a lever arm 150 by a pin member 151, the lever arm 150 being pivotally secured to the plate member 128 by a pivot pin 152.

The weight member 148 is secured to a second lever arm 154 by means of a pivot pin 156, the lever arm 154 being supported at one end by a pivot pin 158, the opposite end thereof being connected to the opposite end of the lever arm 150 by means of a linkage arm 160 and associated pivot pins 162 and 163, respectively. The linkage arm 160 is telescopingly adjustable and may be locked in place by a set screw 165.

An elongated crank arm member 164 is pivotally secured to the lever arm 154 by means of a pivot pin 166 located between the pins 158 and 156. The opposite end of the crank arm member 164 is secured to an elongated cam shaft member 168 by means of a yoke 170 and bolt 172.

The weight members 146 and 148 are urged inwardly toward the axle 44 by means of a tension spring 174 which is connected between a fixed pin 176 and a bore 178 on the lever arm 154.

The opposite or outer surface of the plate member 128 is provided with a pair of oppositely disposed arcuate frictional members 180 and 182, the outer surfaces of which are provided with friction pads 184. These frictional members 180 and 182 may be constructed from brake shoes typically used on automobile wheels. The shoe members 180 and 182 are pivotally secured to the plate 128 by pivot pins 186 and 188, respectively. The opposite ends of the shoe members 180 and 182 are urged together by a tension spring 190 which is attached between the shoe members 180 and 182 by means of bores 192 and 194.

The free ends 196 and 198 of the shoe members 180 and 182 are in contact with an oblong shaped cam member 200 which is connected directly to the outer end of the cam shaft member 168. The shoe members 180 and 182 are positioned so that the outer frictional pad members thereof are disposed within the drum member 144 so that when the pad members move outwardly against the tension of the spring 190, the frictional pad members 184 thereof contact and frictionally engage the drum 144.

It can be seen that when the weights 146 and 148 are retracted as shown in FIG. 7, the frictional pad members 184 are also retracted away from contact with the drum 144 thereby allowing the hub 52 to rotate freely with respect to the axle 44 and the wheel 14. However, when the speed of the hub member 52 increases sufficiently to cause the weight members 146 and 148 to extend as shown in FIG. 8, the action of the cam member 200 causes the shoe members 180 and 182 to expand so that their pad members 184 are in frictional contact with the drum 144 thereby imparting drive power from the sprocket 46 to the wheel 14.

An annular member 202 is secured to the cylindrical member 132 by a plurality of bolts 204. A plurality of ratchet pawls 206 are pivotally attached to the ring member 202 by pivot pins 208 and associated compression spring members 210. The spring members 210 cause the outer ends of the pawls 206 to be forced outwardly. The shape of the ratchet pawls are such that they may be pivoted in the direction against the compression springs 210 but may not be pivoted past their fully extended point in the opposite direction. Hence, they are biased in one direction only.

The inner surface of the plate member 140 is provided with an annular member 212 having ratchet teeth 214 around the inner periphery thereof. The ring member 212 is positioned with respect to the ratchet pawls 206 such that said ratchet pawls extend into contact with the ratchet teeth 214.

Figure 9:
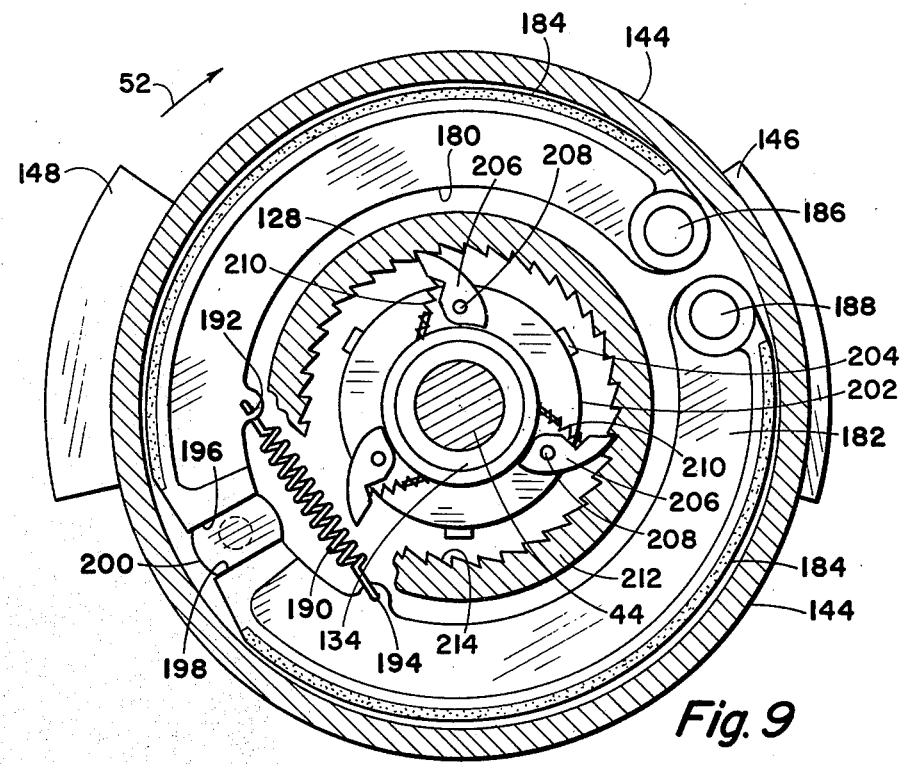
FIG. 9 is a sectional view of the high-speed hub assembly taken along the broken lines 9—9 of FIG. 6.
Figure 10:
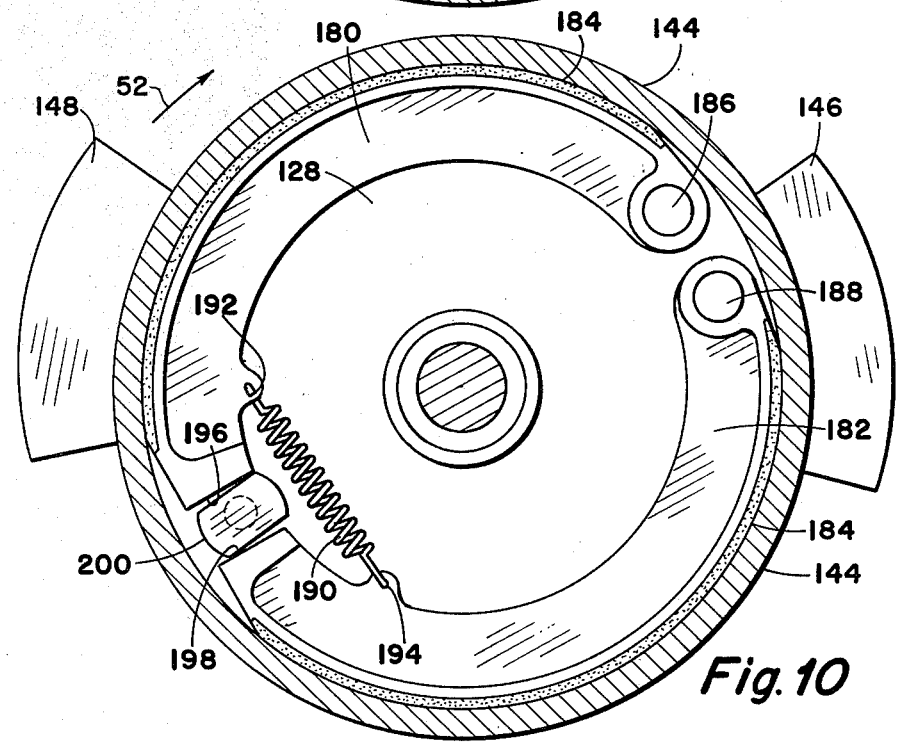
FIG. 10 is the sectional view of FIG. 9 shown in a second position.

As hereinbefore stated, the ratchet pawls 206 are biased such that the hub member 52 may be rotated forwardly or in a clockwise direction as shown in FIG. 9 with respect to the drum 144 and associated ratchet teeth 214, but not in reverse with respect to said ratchet teeth 214.

Therefore, if the sprocket wheel 46 is made to rotate in a reverse direction, the ratchet pawls 206 will engage the ratchet teeth 214 and thereby impart a reverse rotation to the wheel 14. However, if the hub member and associated sprocket wheel 46 are rotating forwardly with respect to the wheel 14, the ratchet pawls will simply travel around the inner periphery of the ratchet teeth 214.

Should the vehicle be operating at a high speed wherein the high-speed hub 52 is engaged, the ratchet pawls will be stationary with respect to the gear teeth 214. However, if the engine is then decelerated or slowed down, as would be the case in encountering a downgrade in the road, the wheel 14 will attempt to move faster than the high-speed hub 52. However, the ratchet pawls 206 will engage the teeth 214 thereby causing the engine to help brake the vehicle.

In operation, it would probably be desirable to set the high-speed hub so that it engages just before the low-speed hub disengages, which would be detected by the operator of the vehicle as a smooth shift from one gear to another. Hence, as the vehicle starts from a stop, it will start accelerating due to power being applied through the low-speed hub to the wheel 12. As the vehicle gains speed, the centrifugal weights 146 and 148 on the high-speed hub will extend thereby causing the frictional members 180 and 182 to encounter the drum, imparting drive from the engine to the wheel 14.

As the vehicle gains speed, the wheel 12 and associated low-speed hub member 38 will start moving faster than the sprocket wheel 40 thereon. This will cause the pin members 114 to travel along the tapered grooves 108 in a ratcheting action until the hub 38 reaches sufficient speed to cause the weights 86 to extend thereby pushing the pins 114 inwardly away from the sprocket 40 whereupon the sprocket 40 will start to free-wheel.

As the vehicle slows down, the weights 86 will start retracting thereby allowing the pins 114 to start a ratcheting action when they encounter the grooves 108 of the sprocket 40. The weights 146 and 148 of the high-speed hub will then retract thereby disconnecting the drive of the high-speed hub, smoothly transferring drive back to wheel 12 from wheel 14.

In order to provide additional stability to the centrifugal weights 86 of the low-speed hub 38, a groove 216 is provided around the outer periphery of each weight 86. A circumferential tension spring 218 is provided around the outer periphery of the weights 86 and is carried specifically in the grooves 216.

The spring 216 further assists the coil spring 72 in resisting disengagement of the hub member 68 from the sprocket 40. This circumferential spring 216 is not considered to be essential for operation of the low-speed hub but may be desirable depending on the detail design of the pivotal weights 86.

From the foregoing it is apparent that the present invention provides a two-speed drive system which is adaptable for substantially any type of vehicle but is particularly suited for a vehicle wherein a chain or pulley drive is utilized. The two-speed feature of the present invention, when matched to an appropriate transmission, will serve to add another gear to the vehicle.

Whereas the present invention has been described in particular relation to the drawings attached hereto, other and further modifications apart from those shown or suggested herein may be made within the spirit and scope of the invention.

What is claimed is:

1. An automatic two-speed drive system for vehicles comprising:
   (a) a drive source;
   (b) a first drive wheel carried by a first axle operably connected to the drive source and comprising a low-speed drive hub and means to disengage said first drive wheel from the power source when said drive wheel reaches a desired rotational speed; and
   (c) a second drive wheel carried by a second axle independent of the first axle, a high-speed drive hub operably connected to the drive source and means for engaging said high-speed drive hub to the drive wheel when the drive source reaches a desired rotational speed.

2. A drive system as set forth in claim 1 wherein the first drive wheel comprises an axle and a wheel journalled thereon and wherein the low-speed hub is secured to the wheel and carried thereby, said hub comprising a first rotational member carried by said wheel, a first drive sprocket journalled on the first rotational member for free rotation with respect thereto and wherein the means for disengaging said first drive wheel comprises a second rotational member carried by the first rotational member and being movable with respect to said first rotational member, said second rotational member being engagable with the first sprocket by a plurality of cooperating pin members, a first plurality of centrifugal extendable weights carried by the first rotational member and operably connected with the second rotational member to move the second rotational member out of engagement with the drive sprocket thereby disengaging said pin members when the first weights are extended.

3. A drive system as set forth in claim 1 wherein the second drive wheel comprises an axle and a wheel journalled thereon and wherein the high-speed hub comprises a high-speed member journalled on the axle, a second sprocket rigidly carried by the high-speed member, a high-speed drum carried by the second drive wheel and wherein the means for engaging said high-speed member comprises movable friction pads pivotally carried by the high-speed member and engagable with the high-speed drum, and a second plurality of oppositely disposed centrifugal weights carried by the high-speed member and operably connected to the frictional members.

4. A drive system as set forth in claim 3 wherein the high-speed member comprises a plate, and wherein the second centifugal weights are connected to one side of the plate by a mechanical linkage, a rotatable cam member attached to the linkage and extending through the plate, a pair of friction pads pivotally carried by the opposite side of the plate member and being engagable with the cam member whereby outward movement of the second centrifugal weights rotates the cam member thereby extending the friction pads into contact with the high-speed drum.

5. An automatic two-speed drive system for vehicles comprising:
   (a) a drive source;
   (b) a first drive wheel operably connected to the drive source and comprising a low-speed drive hub and means to disengage said first drive wheel from the power source when said drive wheel reaches a desired rotational speed; and
   (c) a second drive wheel, a high-speed drive hub operably connected to the drive source and means for engaging said high-speed drive hub to the drive wheel when the drive source reaches a desired rotational speed and including means carried by the high-speed drive hub to prevent the second drive wheel from rotating in a forward direction faster than the high-speed drive hub.

6. A drive system as set forth in claim 5 wherein the drive source comprises a motor, a transmission and a sprocket assembly for transmitting power to the first and second drive wheels, said transmission means including a reverse gear.

7. An automatic two-speed drive system for vehicles comprising:
   (a) a drive source;
   (b) a first drive wheel operably connected to the drive source and comprising a low-speed drive hub and means to disengage said first drive wheel from the power source when said drive wheel reaches a desired rotational speed; and
   (c) a second drive wheel, a high-speed drive hub operably connected to the drive source and means for engaging said high-speed drive hub to the drive wheel when the drive source reaches a desired rotational speed,
   wherein the first drive wheel comprises an axle and a wheel journalled thereon and wherein the low-speed hub is secured to the wheel and carried thereby, said hub comprising a first rotational member carried by said wheel, a first drive sprocket journalled on the first rotational member for free rotation with respect thereto and wherein the means for disengaging said first drive wheel comprises a second rotational member carried by the first rotational member and being movable with respect to said first rotational member, said second rotational member being engagable with the first sprocket, a first plurality of centrifugal extendable weights carried by the first rotational member and operably connected with the second rotational member to move the second rotational member out of engagement with the drive sprocket when the first weights are extended wherein the first centrifugal weights are pivotally attached to the first rotational member by a lever arm and wherein said second rotational member comprises pin members in contact with said lever arms so that as the weights are moved outwardly by centrifugal force, the pins are forced away from the first rotational member thereby taking the second rotational member out of engagement with the drive sprocket.

8. A drive system as set forth in claim 7 wherein the second rotational member comprises a plurality of pin members extending toward the drive sprocket, a plurality of tapered recesses provided in the drive sprocket whereby said drive sprocket may impart rotation to the second rotational member in one direction only when the second rotational member is in contact with said drive sprocket.

9. An automatic two-speed drive system for vehicles comprising
(a) a drive source;
(b) a first drive wheel operably connected to the drive source and comprising a low-speed drive hub and means to disengage said first drive wheel from the power source when said drive wheel reaches a desired rotational speed; and
(c) a second drive wheel, a high-speed drive hub operably connected to the drive source and means for engaging said high-speed drive hub to the drive wheel when the drive source reaches a desired rotational speed, wherein the second drive wheel comprises an axle and a wheel journalled thereon and wherein the high-speed hub comprises a high-speed member journalled on the axle, a second sprocket rigidly carried by the high-speed member, a high-speed drum carried by the second drive wheel and wherein the means for engaging said high-speed member comprises movable friction pads carried by the high-speed member and engagable with the high-speed drum, and a second plurality of centrifugal weights carried by the high-speed member and operably connected to the frictional members, wherein the high-speed member comprises a plate, and wherein the second centrifugal weights are connected to one side of the plate by a mechanical linkage, a rotatable cam member attached to the linkage and extending through the plate, a pair of friction pads pivotally carried by the opposite side of the plate member and being engagable with the cam member whereby outward movement of the second centrifugal weights rotates the cam member thereby extending the friction pads into contact with the high-speed drum, wherein the means to prevent the second drive wheel from rotating faster than the high-speed hub comprises a plurality of ratchet pawls yieldably carried by the high-speed hub, a plurality of ratchet teeth carried by the high-speed drum, said ratchet teeth being in engagement with the ratchet pawls, said ratchet pawls being biased whereby the drum and associated ratchet pawls may be rotated forwardly with respect to the second drive wheel but not rotated in reverse with respect thereto.

* * * * *